US012568352B2

(12) United States Patent　　　　　(10) Patent No.:　US 12,568,352 B2
Haswarey et al.　　　　　　　　　　(45) Date of Patent:　Mar. 3, 2026

(54) ENHANCED SUPPORT FOR ROAMING CONNECTIVITY BY USER EQUIPMENT ASSOCIATED WITH MOBILE VIRTUAL NETWORK OPERATORS

(71) Applicant: T-MOBILE INNOVATIONS LLC, Overland Park, KS (US)

(72) Inventors: Bashir A. Haswarey, Elmhurst, IL (US); Mohammad Abu-Samra, Orland Park, IL (US); Narothum Saxena, Hoffman Estates, IL (US); Michael S. Irizarry, Barrington Hills, IL (US)

(73) Assignee: T-Mobile Innovations LLC, Overland Park, KS (US)

( * ) Notice: Subject to any disclaimer, the term of this patent is extended or adjusted under 35 U.S.C. 154(b) by 561 days.

(21) Appl. No.: 18/091,647

(22) Filed: Dec. 30, 2022

(65) Prior Publication Data

US 2024/0224020 A1　　Jul. 4, 2024

(51) Int. Cl.
H04W 8/12　　　　(2009.01)
H04W 48/02　　　(2009.01)

(52) U.S. Cl.
CPC ............. H04W 8/12 (2013.01); H04W 48/02 (2013.01)

(58) Field of Classification Search
CPC ....... H04W 48/02; H04W 8/205; H04W 8/18; H04W 60/005; H04W 8/12; H04W 8/183; H04W 60/04; H04L 67/306
USPC ................ 455/432.1, 432.2, 432.3, 433, 419
See application file for complete search history.

(56) References Cited

U.S. PATENT DOCUMENTS

| 10,200,852 | B1 * | 2/2019 | Datar | ...................... H04W 8/06 |
| 10,735,940 | B1 * | 8/2020 | Sharma | ................... H04W 8/12 |
| 11,564,081 | B1 * | 1/2023 | Gundavelli | ........... H04W 60/00 |
| 11,622,259 | B2 * | 4/2023 | Roy | ...................... H04W 12/40 |
| | | | | 455/419 |
| 11,785,456 | B2 * | 10/2023 | Gundavelli | ......... H04W 12/069 |
| | | | | 726/7 |

(Continued)

FOREIGN PATENT DOCUMENTS

| CN | 103905667 A | * | 7/2014 | |
| CN | 105830504 A | * | 8/2016 | ............ H04W 60/00 |

*Primary Examiner* — David Q Nguyen

(74) *Attorney, Agent, or Firm* — SHOOK, HARDY & BACON L.L.P.

(57) ABSTRACT

A system and method are described that are carried out by a core network element of a primary network operator (NO) to manage agreement-based limited usage of roaming mobile wireless data services of a secondary mobile network operator (MNO) by roaming user equipment (UE) devices of a mobile virtual network operator (MVNO) in accordance with usage limiting terms arising from an agreement between the primary NO and the MVNO. The method includes maintaining a roaming usage filter definition arising from the agreement between the primary NO and the MVNO. The core network element receives a connection request message from the secondary MNO for a roaming UE device for which the agreement is applicable. The core network element applies usage limiting terms of the roaming usage filter definition to the connection request, and forwards the connection request to the MVNO in accordance with a result of the applying that indicates usage limiting terms are not exceeded by a current measure of roaming mobile wireless data services by UE devices of the MVNO.

14 Claims, 2 Drawing Sheets

(56) References Cited

U.S. PATENT DOCUMENTS

2019/0053185 A1* 2/2019 Shah ..................... H04W 8/205
2019/0327603 A1* 10/2019 De Figueiredo Junior .................
H04L 41/08

* cited by examiner

FIG. 2

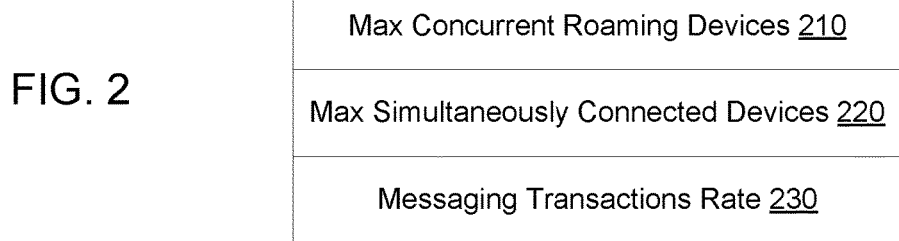

Max Concurrent Roaming Devices <u>210</u>

Max Simultaneously Connected Devices <u>220</u>

Messaging Transactions Rate <u>230</u>

300

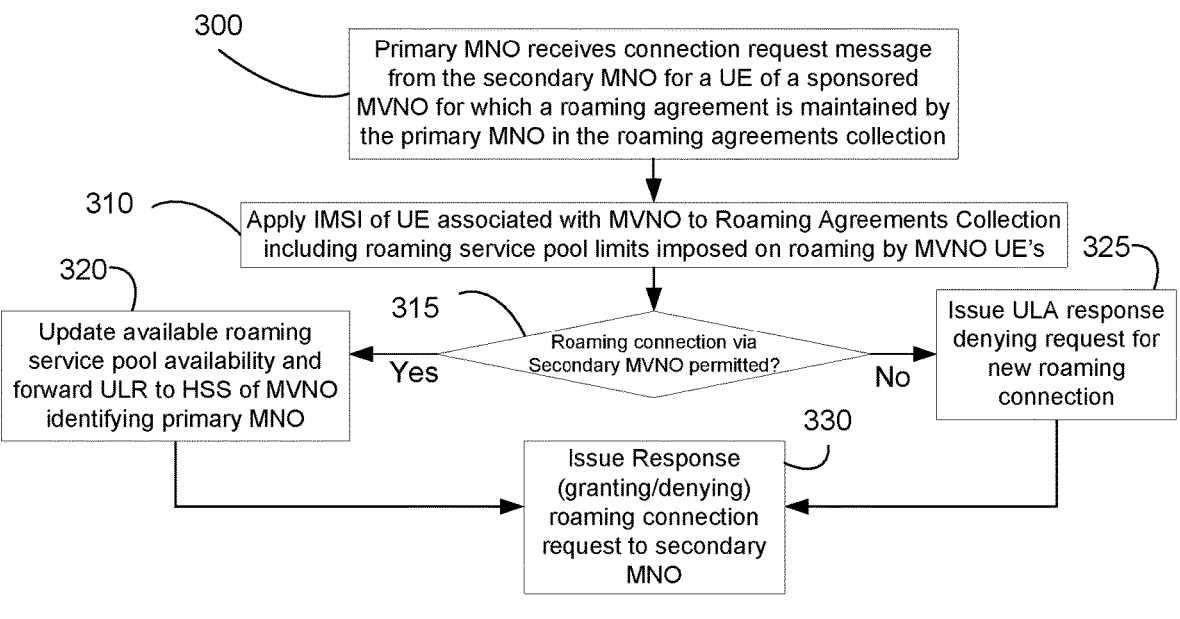

Primary MNO receives connection request message from the secondary MNO for a UE of a sponsored MVNO for which a roaming agreement is maintained by the primary MNO in the roaming agreements collection

310

Apply IMSI of UE associated with MVNO to Roaming Agreements Collection including roaming service pool limits imposed on roaming by MVNO UE's

325

320

Update available roaming service pool availability and forward ULR to HSS of MVNO identifying primary MNO

315

Roaming connection via Secondary MVNO permitted?

Yes

No

Issue ULA response denying request for new roaming connection

330

Issue Response (granting/denying) roaming connection request to secondary MNO

FIG. 3

ENHANCED SUPPORT FOR ROAMING CONNECTIVITY BY USER EQUIPMENT ASSOCIATED WITH MOBILE VIRTUAL NETWORK OPERATORS

FIELD OF THE INVENTION

The present disclosure generally relates to mobile wireless communications. More particularly, the present disclosure is directed network operators supporting sponsored roaming data service support for user equipment (including Internet of things devices) associated with mobile virtual network operators.

BACKGROUND OF THE INVENTION

Mobile wireless network operator (MNO) carriers are known to provide radio access network (RAN) support for mobile virtual network operators (MVNOs). In a particular arrangement of interest herein, a heavy MVNO includes a fully operational core network but does not own/operate RAN infrastructure or may own/operate a RAN with limited coverage. In areas where cellular service is needed, the heavy MVNO relies upon a RAN of a primary MNO and is assigned international mobile subscriber identity (IMSI) blocks leased from the primary MNO (also referred to herein as a host mobile carrier).

In cases where user equipment (UE) devices of the MVNO issue a connection request in a geographic area that is not served by a primary MNO, or for any reason requires coverage provided by a secondary MNO, with which the MVNO has an agreement for supporting data services, a challenge exists for setting up a roaming mobile wireless data service, via the secondary MNO, in support of such UE devices that are present in the area served by the secondary MNO's RAN.

By way of a particular example, the UE device is an Internet of Things (IoT) appliance. The heavy MVNO has established a services agreement supporting the IoT appliance with the primary MNO for handling roaming UE devices within a particular range of IMSI blocks leased from the primary MNO. Moreover, the primary MNO has a roaming services agreement with the secondary MNO such that the secondary MNO supports mobile wireless data service requests of UE devices identified as falling within certain IMSI ranges. In such scenario, the intention is to support mobile wireless data service requests by IoT appliances of the MVNO, via a RAN of the secondary MNO, without establishing a mobile wireless data service contract (including particularized terms thereof) between the secondary MNO and the MVNO.

SUMMARY OF THE INVENTION

A system and method are disclosed that are carried out by a core network element of a primary network operator (NO) to manage agreement-based limited usage of roaming mobile wireless data services of a secondary mobile network operator (MNO) by roaming user equipment (UE) devices of a mobile virtual network operator (MVNO) in accordance with usage limiting terms arising from an agreement between the primary NO and the MVNO. The method includes maintaining a roaming usage filter definition arising from the agreement between the primary NO and the MVNO. The core network element receives a connection request message from the secondary MNO for a roaming UE device for which the agreement is applicable. The core network element applies usage limiting terms of the roaming usage filter definition to the connection request, and forwards the connection request to the MVNO in accordance with a result of the applying that indicates usage limiting terms are not exceeded by a current measure of roaming mobile wireless data services by UE devices of the MVNO.

BRIEF DESCRIPTION OF THE DRAWINGS

While the appended claims set forth the features of the present invention with particularity, the invention and its advantages are best understood from the following detailed description taken in conjunction with the accompanying drawings, of which:

FIG. 2 is a schematic diagram summarizing an exemplary set of fields of a filter definition used to configure operation of the disclosed method and system in accordance with an MVNO-specific roaming data services agreement between the primary MNO and an identified MVNO in accordance with the disclosure; and FIG. 3 is a flow diagram summarizing an exemplary set of operations carried out by a diameter routing algorithm (DRA) and steering of roaming (SoR) module of a primary MNO in accordance with the present disclosure.

DETAILED DESCRIPTION OF THE DRAWINGS

Figure 1:
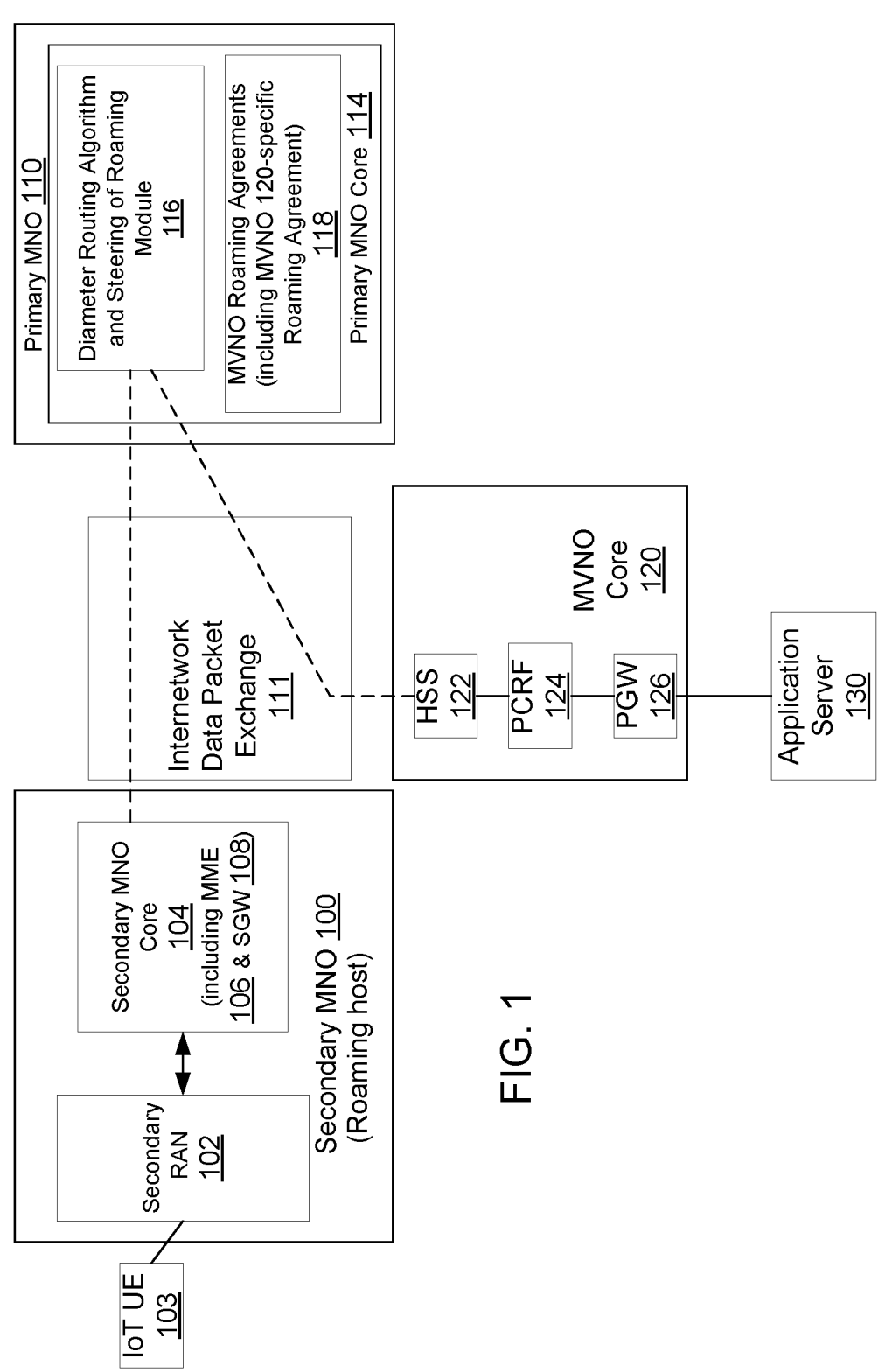
FIG. 1 is a schematic diagram of an exemplary mobile wireless network radio network environment including a secondary MNO having a RAN through which UE devices of an MVNO establish an air connection, and a primary MNO providing an intermediate connection between the secondary MNO and the MVNO in accordance with the disclosure.

A system, in accordance with the present disclosure, includes a primary MNO hosting UE devices associated with an MVNO and that may operate in a geographic region requiring the use of a secondary MNO for which the MVNO has not established a data services agreement to provide roaming mobile wireless data services MVNO-affiliated UE devices.

In operation, a UE device of a customer of the MVNO issues a connection request to a RAN of the secondary MNO including an IMSI assigned to the UE device. The mobility management entity (MME) of the secondary MNO resolves a provided IMSI to the primary MNO and forwards the connection request to the primary MNO in accordance with a roaming data services agreement entered between the secondary MNO and the primary MNO. The primary MNO, in turn, uses the IMSI to identify/retrieve an applicable roaming data services agreement from a collection of MVNO roaming data services agreements entered between the primary MNO and MVNOs. Each roaming data services agreement provides a set of rules/terms of a roaming data services agreement entered between the primary MNO and an identified MVNO to support roaming data services, for a UE associated with the identified MVNO, via a tunneled connection from the UE to a packet gateway (PGW) of the identified MVNO, through the secondary MNO and primary MNO. By way of a particular example, a diameter routing algorithm (DRA) and steering of roaming (SoR) module of the primary MNO applies terms of the identified/retrieved roaming data service agreement to the connection request of the UE device, and conditionally forwards (if permitted under the agreement terms) the connection request to a home subscriber server (HSS) of the identified MVNO resulting in the construction of a tunnel-supported data services session, via the core networks of both the secondary and primary core networks, between the UE and the PGW of the identified MVNO in accordance with terms of the identified/retrieved agreement between the primary MNO and the identified MVNO.

Turning to FIG. 1, an exemplary environment for carrying out the present disclosure is schematically depicted. A secondary mobile network operator (MNO) 100, operating as a roaming mobile wireless data services host, includes a secondary RAN 102 and a secondary MNO core 104 network. The secondary RAN 102 is configured to receive a request from an IoT UE device 103 for mobile wireless data network services. The secondary MNO core 104 includes both a mobility management entity (MME) 106 and a source gateway (SGW) 108.

The secondary MNO 100 is configured to communicate with a primary MNO 110 (or more generally a network operator (NO) that may/may not operate an associated RAN) via an internetwork data packet exchange 111. By way of example, communication between the secondary MNO 100 and primary MNO is carried out in accordance with IR.21 (GSM Association Roaming Database, Structure and Updating Procedures) under which the IMSI block of the primary MNO 110 is published to all secondary MNOs, including the secondary MNO 100. In accordance with the present disclosure, the primary MNO 110 includes a primary MNO core 114 that includes a diameter routing algorithm (DRA) and steering of roaming (SoR) module 116. In accordance with the present disclosure, the DRA and SoR module 116 applies an identification provided in a request from the IoT UE device 103 for roaming services to a collection of MVNO roaming data services agreements 118, entered between the primary MNO 110 and a set of MVNOs, to identify/retrieve an appropriate one of the maintained MVNO-specific agreements (see FIG. 2 for an exemplary set of terms/filter elements of agreements) relating to the IoT UE device 103 associated with an MVNO 120. In accordance with the present disclosure, in addition to carrying out known authentication/authorization messaging, the DRA part carries out an identification and selective routing of the IoT UE device 103 requests received from secondary MNOs, such as the secondary MNO 100, associated with one or more agreements maintained in the roaming agreements 118 of the primary MNO 110 that may specify one or more usage filtering/limiting elements such as the ones listed, by way of example, in FIG. 2 described herein below.

In accordance with the present disclosure, a particular aspect of the SoR part of the combined DRA and SoR module 116 includes facilitating selecting a roaming partner from a list of available roaming partners available at a current geographic location of the IoT UE device 103 (among potentially multiple available secondary MNOs with which the primary MNO 110 has established sponsored relationships on behalf of MVNOs).

During initialization/configuration of the agreements 118, the SoR part facilitates defining and loading roaming agreements as a set of policies/rules based on roaming agreements between the primary MNO 110 and a plurality of secondary MNOs. The policies establish a pool size of sponsored roaming service available across various secondary MNOs with respect to a set of MVNOs (UEs) sponsored on the secondary MNOs by the primary MNO. Thereafter, during operation, the SoR part actively tracks allocation of pool capacity (decrementing/increasing the available pool size as UE devices are connected/disconnected from identified secondary MNOs).

Additionally, the SoR part is configured to enforce compliance to usage terms/limits specified in roaming agreements between the primary MNO and the secondary MNOs (without regard to particular sponsors MVNOs).

In accordance with a further aspect of the disclosure, the DRA and SoR module 116, upon determining the MVNO 120 associated with the IoT UE device 103, forwards a (verified/validated) request from the IoT UE device 103 to a home subscriber server (HSS) 122 of the MVNO 120 in accordance with an MVNO-specific roaming data service agreement from the collection of MVNO roaming data services agreements 118. The HSS 122 applies the provided request (including the identifier for the IoT UE device 103 to commence (if permitted) signaling that, upon completion, results in a tunnel-supported data services session, via the secondary MNO core 104 and the primary MNO core 114, between the IoT UE device 103 and a PGW 126 of the MVNO 120 in accordance with terms of the identified/retrieved agreement between the primary MNO 110 and the identified MVNO 120. The PWG 126, upon establishing a tunneling connection to the IoT UE device 103, connects to, for example, an application server 130 (e.g., real-time video monitoring server) supporting an application session between the application server 130 and the IoT UE device 103.

With continued reference to FIG. 1, it is noted that simplified depictions are provided of the primary MNO 110 and the secondary MNO 100 to emphasize enhanced aspects of the primary MNO 110 relating to the DRA and SoR module 116 supporting configurable support of roaming mobile wireless data services for the IoT UE device 103 associated with the MVNO 120—in accordance with: (1) a first agreement constituting terms of an MVNO-specific roaming agreement between the primary MNO 110 and the MVNO 120; and (2) a second (general) roaming data services agreement between the primary MNO 110 and the secondary MNO 100 that is distinct from the first agreement.

Turning briefly to FIG. 2, an exemplary summary is provided of data fields of a configurable filter applied by the DRA and SoR module 116 while servicing data services on behalf of roaming devices (e.g. IoT UE device 103) operating in an area served by the secondary MNO 100 in accordance with a sponsored roaming agreement between the secondary MNO 100 and the primary MNO 110. In general, the sponsored roaming agreement terms are reduced to a set of limiting values with respect to number and activity of UE devices of the MVNO that are using the secondary MNO 100. In the illustrative example, a maximum concurrent roaming devices 210 indicates a count limit for the number of devices deemed to be residing in a RAN coverage area of the secondary MNO 100. A maximum simultaneously connected device 220 specifies a maximum number of devices for which concurrent connections originating from the secondary MNO and passing through the primary MNO 110 to the MVNO 120 will be permitted. A message transactions rate 230 specifies a maximum number of messaging transactions per time period (e.g. per day) that will be permitted that originate from the secondary MNO 100, and pass through the primary MNO 110 to the MVNO 120. The current listing is exemplary in nature and solely intended to provide potential contract terms between the primary MNO 110 and the MVNO 120 that may be converted into elements of a usage filter with respect to roaming devices of the MVNO 120 that consume roaming mobile wireless data services provided by the secondary VNO 100.

Turning to FIG. 3, a flowchart summarizes operation of the DRA and SoR module 116 of the primary MNO 110 to process a roaming data service requests initiated by the IoT UE device 103 received via the secondary MNO 100, and a tunneling connection subsequently established between the IoT UE device 103 and the MVNO 120 in accordance with an MVNO-specific roaming agreement for the MVNO 120 maintained within the MVNO roaming agreements 118 of the primary MNO core 114.

Before discussing the illustrative operation of the DRA and SoR module 116 of the primary MNO 110 summarized in FIG. 3, a set of three known (3GPP S6A) signaling steps/stages are summarized below with certain enhancements added in accordance with the present disclosure.

First, an AIR/AIA (Authentication-Information-Request/Answer) stage comprises an authentication information retrieval message that the MME 106 initiates towards the HSS 122, for the IoT UE 103 to attach to the visiting network for high-speed data services. The AIR message includes, among other parameters, an IMSI associated with the IoT UE 103. In known signaling, upon successful authentication, the HSS 122 returns an authentication-information answer (AIA) message that includes authentication vectors in a case of authentication/authorization success. Upon receipt of the AIA (success) response, the IoT UE 103 verifies the authentication information provided in the AIA response.

Second, an ULR/ULA (Update-Location-Request/Answer) stage, after successful authentication of the AIA response message from the HSS 122, comprises messaging/signaling in the form of an update location request (ULR) that is transmitted to the home network—in this case the MVNO 120. The ULR message includes the IMSI of the IoT UE 103 and roaming information. The roaming information includes, for example, an MCC, MNC, and cell identifier. Upon receiving the ULR message, the HSS 122 checks for a corresponding subscription for supporting the requested/identified roaming data services. If the IMSI (mobile subscriber) subscription is found and the subscriber is allowed permitted to use data in an identified visited network, then the HSS 122 responds to the request with an update location answer (ULA) message. It is noted, that an identity of the visited network in the ULR controlled, in accordance with the present disclosure, by the DRA and SoR module 116 that (instead of identifying the secondary MNO network 100—for which a valid roaming agreement may not specifically exist for the MVNO) identifies the primary MNO 110 network with which the HSS 122 can indeed establish a valid connection. Upon successful verification, the HSS 122 sends an update location answer (ULA) message to the DRA and SoR module 116 including subscription data comprising a list of access point names (APNs).

Third, a CLR/CLA (Cancel-Location-Request/Answer) stage takes place during roaming after/when a UE changes location that causes a change to a new MME from the MME 106. The UE device 103 attaches to a new MME and the HSS 122 clears the data from the MME 106. When the HSS 122 detects that the UE 103 associated with a new MME, the HSS 122 sends the CLR message to the MME 106, and the MME 106 responds by sending a corresponding CLA message to the HSS 122.

In accordance with the illustrative example, when the IoT UE device 103 needs to establish a data link via a mobile wireless air interface, the IoT UE device 103 issues a connection request to the secondary RAN 102 that, in accordance with roaming service agreements between the secondary MNO 100 and the primary 110, is transmitted by the MME 104 to the primary MNO 110 for processing by the DRA and SoR module 116 in accordance with the enhanced roaming data services support operations summarized in FIG. 3 and discussed herein below.

In particular, during 300, the primary MNO 110 receives the connection request originating from the IoT UE device 103 and including an IMSI corresponding to at least one MVNO roaming agreement of the collection of MVNO-specific roaming agreements 118.

Thereafter, during 310, the DRA part routes the roaming UE request originated by the IoT UE device 103 (and passed via the secondary MNO core 104 to the primary MNO 110) for processing by the SoR part of the DRA and SoR module 116. The SoR part applies a responsive one of the MVNO-specific roaming agreements 118 to the received roaming connection initiation request. In accordance with an illustrative example, during 310 the SoR part verifies that a current available capacity of an identified/applicable sponsored roaming data service pool is not depleted. The SoR part is configured to apply any of a variety of conditions and/or filters for conditionally permitting the roaming connection request from the IoT device 103 to be passed to the HSS 122 of the MVNO 120.

Control passes to 315 wherein, if the applicable roaming data service pool is not depleted and any other applicable request "filtering" criteria are met for the MVNO-specific request by the user equipment 103, control passes to 320 wherein: (1) the available capacity of the applicable roaming data service pool is reduced in accordance with a grant of the roaming UE device 103 connection request, and (2) the roaming connection request is passed (with the visited MNO being identified as the primary MNO 110—as opposed to the secondary MNO 100 to which RAN access is being provided) to the HSS 122 of the MVNO 120. Upon receiving a confirmatory answer from the HSS 122, control then passes to 330 wherein the primary MNO builds and issues an answer message to the initial roaming connection request message from the secondary MNO.

On the other hand, if the roaming connection request from the UE device 103 is determined by the SoR part to not meet applicable requirements (i.e., the roaming connection via the secondary MNO 100 is not permitted), then control passes to 325 where the DRA part of the DRA and SoR module generates and issues "denial" response, and control passes to 330 wherein the primary MNO 110 builds and issues a response to the secondary MNO 100 indicating a denial of the connection request issued by the IoT UE device 103.

All references, including publications, patent applications, and patents, cited herein are hereby incorporated by reference to the same extent as if each reference was individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method carried out by a core network element of a primary network operator (NO) to manage agreement-based limited usage of roaming mobile wireless data services of a secondary mobile network operator (MNO) by roaming user equipment (UE) devices of a mobile virtual network operator (MVNO) in accordance with usage limiting terms arising from an agreement between the primary NO and the MVNO, the method carried out by the core network element of the primary mobile network operator comprising:

maintaining a roaming usage filter definition arising from the agreement between the primary NO and the MVNO;

receiving a connection request message from the secondary MNO for a roaming UE device for which the agreement is applicable;

applying usage limiting terms of the roaming usage filter definition to the connection request; and forwarding the connection request to the MVNO in accordance with a result of the applying that indicates usage limiting terms are not exceeded by a current measure of roaming mobile wireless data services by UE devices of the MVNO.

2. The method of claim 1, wherein the roaming usage filter definition specifies a maximum concurrent roaming devices of the MVNO on the secondary MNO.

3. The method of claim 1, wherein the roaming usage filter definition specifies a maximum simultaneously connected roaming devices of the MVNO on the secondary MNO.

4. The method of claim 1, wherein the roaming usage filter definition specifies a maximum aggregated messaging transactions rate by roaming devices of the MVNO on the secondary MNO.

5. The method of claim 1, wherein the UE device is an Internet of Things (IoT).

6. The method of claim 1, wherein the core network element is at least in part a diameter routing algorithm (DRA) component augmented with additional logic for performing the applying usage limiting terms of the roaming usage filter definition to the connection request.

7. The method of claim 1, wherein the primary NO is a mobile network operator (MNO).

8. A core network element of a primary network operator (NO) configured to carry out a method for managing agreement-based limited usage of roaming mobile wireless data services of a secondary mobile network operator (MNO) by roaming user equipment (UE) devices of a mobile virtual network operator (MVNO) in accordance with usage limiting terms arising from an agreement between the primary NO and the MVNO, wherein the core network element comprises:

a processor; and a non-transitory computer readable medium including computer-executable instructions that, when executed by the processor, cause the core network element to carry out a method comprising:

maintaining a roaming usage filter definition arising from the agreement between the primary NO and the MVNO;

receiving a connection request message from the secondary MNO for a roaming UE device for which the agreement is applicable;

applying usage limiting terms of the roaming usage filter definition to the connection request; and forwarding the connection request to the MVNO in accordance with a result of the applying that indicates usage limiting terms are not exceeded by a current measure of roaming mobile wireless data services by UE devices of the MVNO.

9. The core network element of claim 8, wherein the roaming usage filter definition specifies a maximum concurrent roaming devices of the MVNO on the secondary MNO.

10. The core network element of claim 8, wherein the roaming usage filter definition specifies a maximum simultaneously connected roaming devices of the MVNO on the secondary MNO.

11. The core network element of claim 8, wherein the roaming usage filter definition specifies a maximum aggregated messaging transactions rate by roaming devices of the MVNO on the secondary MNO.

12. The core network element of claim 8, wherein the UE device is an Internet of Things (IoT).

13. The core network element of claim 8, wherein the core network element is at least in part a diameter routing algorithm (DRA) component augmented with additional logic for performing the applying usage limiting terms of the roaming usage filter definition to the connection request.

14. The core network element of claim 8, wherein the primary NO is a mobile network operator (MNO).

* * * * *